United States Patent [19]
Jabsen

[11] 3,862,884
[45] Jan. 28, 1975

[54] FUEL ASSEMBLY FOR A NUCLEAR REACTOR
[75] Inventor: Felix S. Jabsen, Lynchburg, Va.
[73] Assignee: The Babcock & Wilcox Company, New York, N.Y.
[22] Filed: Nov. 21, 1972
[21] Appl. No.: 308,641

Related U.S. Application Data
[63] Continuation of Ser. No. 2,767, Jan. 14, 1970, abandoned.

[52] U.S. Cl. .................. 176/78, 176/76, 176/81
[51] Int. Cl. ............................................. G21c 3/34
[58] Field of Search ............ 176/76, 78, 22, 87, 75, 176/81

[56] References Cited
UNITED STATES PATENTS

| 3,105,026 | 9/1963 | Dickson | 176/78 X |
| 3,150,057 | 9/1964 | Monson et al. | 176/78 |
| 3,167,484 | 1/1965 | Beutel | 176/78 |
| 3,287,230 | 11/1966 | Jerkins et al. | 176/77 |
| 3,354,045 | 11/1967 | MacFall et al. | 176/78 |
| 3,379,619 | 4/1968 | Andrews et al. | 176/78 |
| 3,505,170 | 4/1970 | Flowers | 176/78 |
| 3,713,971 | 1/1973 | Santen et al. | 176/78 X |

Primary Examiner—Carl D. Quarforth
Assistant Examiner—Roger S. Gaither
Attorney, Agent, or Firm—J. M. Maguire, Esq.; J. P. Sinnott, Esq.

[57] ABSTRACT

A nuclear reactor fuel assembly containing a plurality of parallel and adjacent fuel rods and guide tubes. The upper grid of the assembly having parallel rows of T-shaped slots with the upper end of each fuel rod having a T-shaped key for supporting engagement within the T-shaped slots.

1 Claim, 4 Drawing Figures

FUEL ASSEMBLY FOR A NUCLEAR REACTOR

This application is a continuation of Ser. No. 2,767, filed Jan. 14, 1970, now abandoned.

The present invention relates in general to the construction of nuclear reactors, and more particularly to the assembly of a fuel element as used in the core of a nuclear reactor.

In certain fuel assemblies of the prior art the multiplicity of fuel rods and guide tubes are rigidly secured to both the upper and lower grid structures. Access for replacement of guide tubes and replacement or the salvaging of fuel pins thus becomes a major time consuming operation since it is necessary to disconnect each and every fuel rod and guide tube in order to remove the grid.

With the improved fuel assembly of the invention, either end grid structure can be removed for access to the fuel pins and guide tubes simply by releasing the guide tube connections, which are much fewer in number than the fuel rods.

According to a preferred embodiment of fuel element assembly in this invention there is provided an upper end grid to accommodate the guide tubes and fuel pins. The grid has a plurality of key slots for receiving a plurality of elongated fuel rods each of which has an upper end key part received in a corresponding slot of the upper end grid. Additionally there is a lower end grid that receives the lower ends of the guide tubes and the fuel rods and constrains them against lateral movement relative to one another. The fuel rods are dependently secured from and supported by the upper end grid, while the lower end grid is supported from the upper end grid by the guide tubes.

Because the fuel rods are arranged in parallel rows as are the upper grid key slots, when the key parts of the fuel pins are in registry with the key slots the upper grid can be installed by sliding it along a path generally perpendicular to the axes of the fuel rods while disengagement can be effected by movement of the grid in the opposite direction. One of the advantages afforded by the invention is that when the fuel assembly is subjected to normal handling, in which it is lifted by its upper grid, the weight of the fuel rods is borne directly by the upper grid, thus minimizing the strain on the guide tubes, and enhancing the safety of the entire assembly.

For a better understanding of the invention, its operating advantages and specific objects attained by its use, reference should be had to the accompanying drawing and descriptive matter in which there is illustrated and described a preferred embodiment of the invention.

IN THE DRAWING

Figure 1:
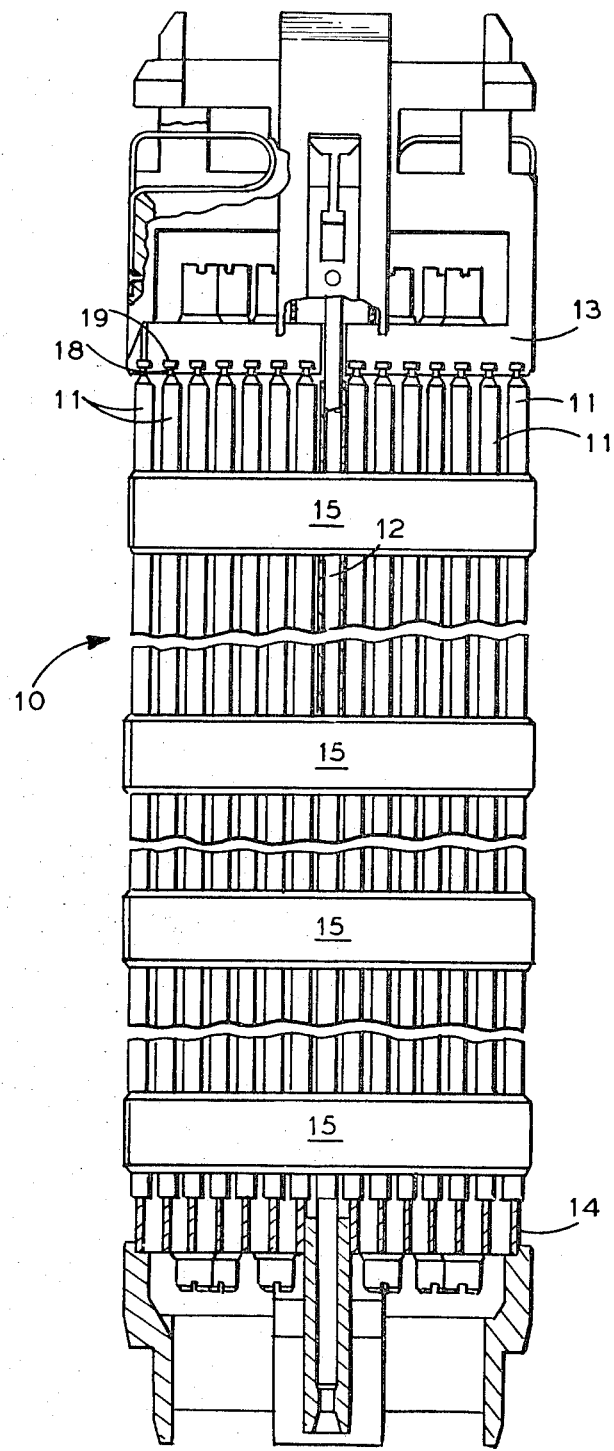
FIG. 1 is an elevation view, partly in section, of an improved fuel element assembly according to a preferred embodiment of the invention.
Figure 2:
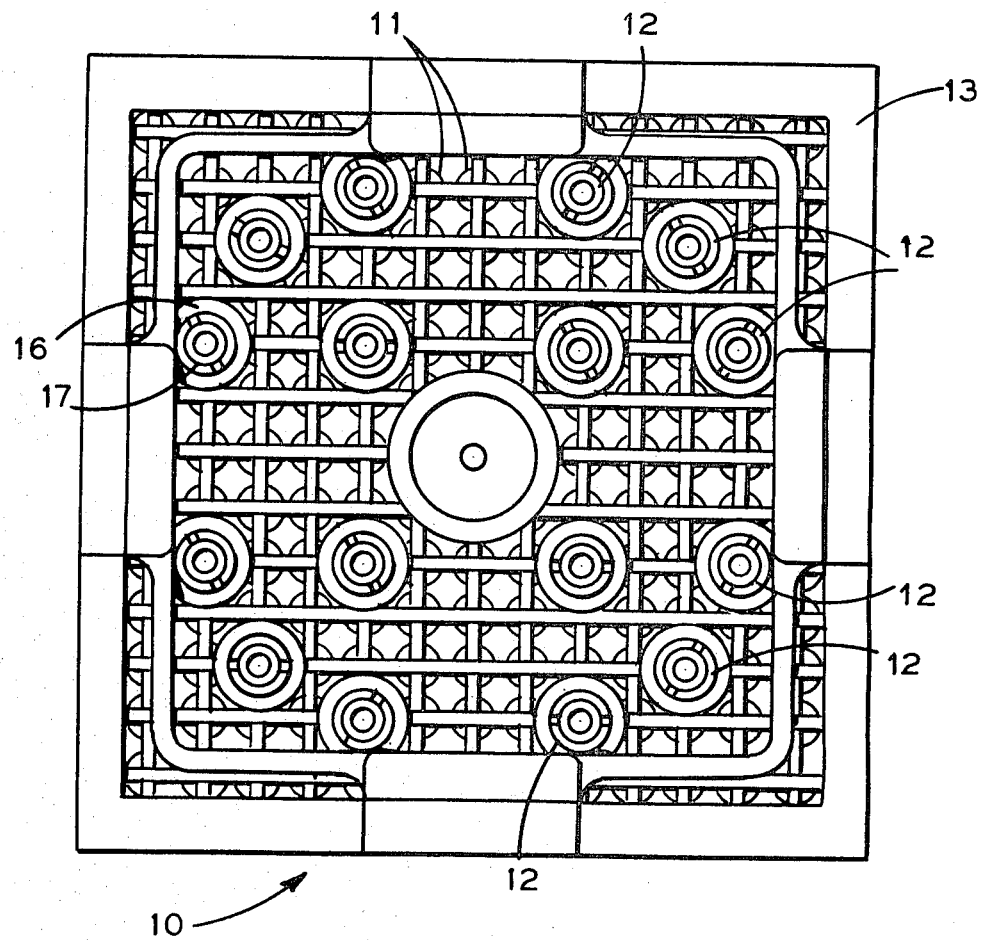
FIG. 2 is a plan view of the assembly shown in FIG. 1.

In FIGS. 1 and 2 there is shown a fuel element assembly 10 for a nuclear reactor (not shown), and having a plurality of elongated upright fuel rods 11 and control rod guide tubes 12 held together by upper and lower end grids 13 and 14 respectively and by one or more intermediate spacer grids 15.

In the fabrication of fuel assembly 10, the rods 11 and guide tubes 12 are inserted into the spacer grids 15 before installing end grids 13 and 14. Guide tubes 12 serve as conduits for the insertion and withdrawal of control rods (not shown) and being much fewer in number than fuel rods 11, the individual tubes 12 are disposed among the rods 11 at preassigned locations. Grids 15 hold the rods 11 and tubes 12 in parallel relation to one another and in plural parallel rows.

According to the concept of the invention, the fuel rods 11 are dependently supported by the upper end grid 13. The lower end grid 14 is connected to and thereby supported by upper end grid 13 by means of the guide tubes 12, each of which is releaseably connected at its upper end and at its lower end to grids 13 and 14 respectively.

To accommodate connection of the guide tubes 12, there are provided as an integral part of end grids 13 and 14 appropriately located fittings 16 through which respective tubes 12 extend in the completed assembly 10. The details of these fittings 16 are better seen in FIGS. 3 and 4. Connection of tubes 12 to grids 13 and 14 is completed by threaded nuts 17 that screw onto threaded end pieces of tubes 12 which project through and beyond fittings 16 to thereby lock the grids 13 and 14 into assembly 10.

Figure 3:
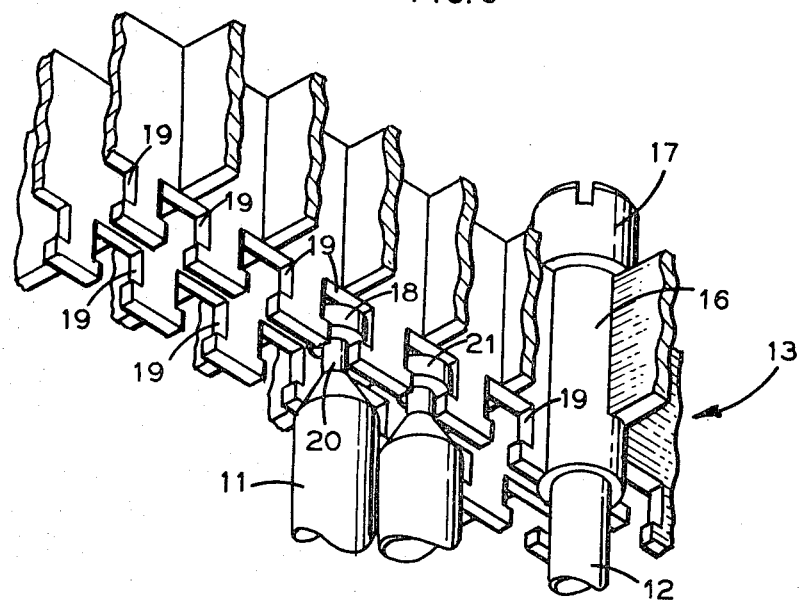
FIG. 3 is a bottom view in perspective of a typical portion of the upper end grid used in the fuel assembly of FIGS. 1 and 2, as shown apart therefrom.
Figure 4:
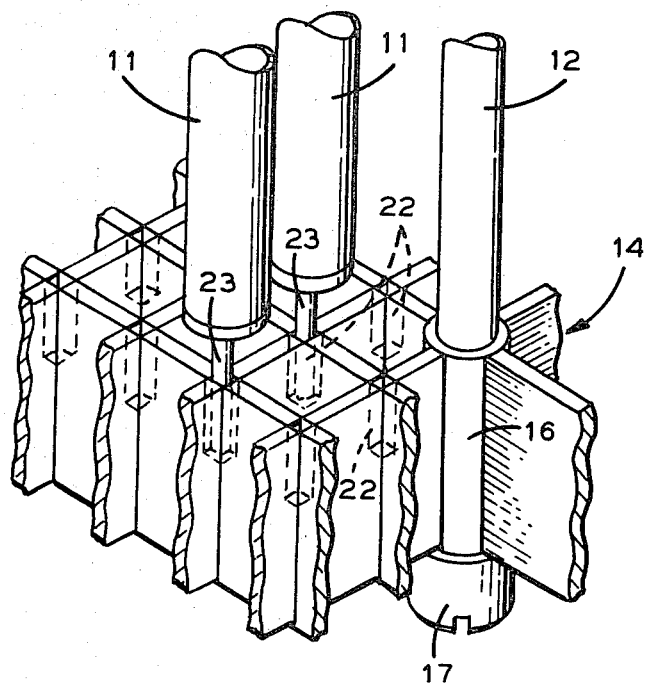
FIG. 4 is a top view in perspective of a typical portion of the lower end grid used in the fuel assembly of FIGS. 1 and 2 as shown apart therefrom.

For suspending the fuel rods 11 from grid 13, at the upper end of each rod 11, there is provided a key part 18 that is received in a corresponding key slot 19 of grid 13. Key part 18 is expediently in the form of a cylindrical stem section 20 connected to a cylindrical disk section 21 such as to give key part 18 a T-shaped longitudinal cross-section that is compatible with the T-shaped configuration of key slots 19. Expediently, all key parts 18 are of the same configuration, as are all key slots 19, as indicated by FIG. 3.

In assembling the fuel element 10, the rods 11 are uniformly positioned axially in grids 15 such that the key parts 18 of all rods 11 in each row thereof are aligned with one another. Key slots 19 are arranged in parallel rows and have the same lateral spacing as corresponding key parts 18 such that the grid 13 can be incorporated into the assembled rods 11 by moving grid 13 along a path transverse to the longitudinal axes of rods 11 until key parts 18 are seated in key slots 19. When each key part 18 is received in its associated slot 19, the guide tubes 12 are advanced through respective fittings 16 of grid 13 and nuts 17 are screwed onto the tube ends.

With grid 13 thus installed, the lower end grid 14 is positioned in alignment with the lower ends of tubes 12 and advanced axially until such tube ends are received through respective fittings 16 of grid 14. As in the case of grid 13, the grid 14 is secured to tubes 12 by nuts 17. The lower grid 14 also receives the lower ends of fuel rods 11 and constrains them against lateral movement relative to one another. For such purpose, there are provided in grid 14 a plurality of recesses 22 that are spaced in accordance with the configuration of rods 11, and, as better seen in FIG. 4, these recesses 22 receive projecting pins 23 of corresponding rods 11. Recesses 22 are so sized in relation to pins 23 as to constrain same, and hence constrain the lower ends of rods 11 against lateral movement, but yet allow the rods 11 to expand freely lengthwise for a limited distance which, by design, is somewhat greater than the maximum anticipated thermal expansion of the assembly 10.

As will be appreciated by the artisan, the foregoing described features of the invention result in a fuel assembly 10 in which the weight of each of the numerous fuel rods 11 is individually carried by the upper grid 13, while the guide tubes 12 carry only the weight of the lower grid 14, and hence are relatively lightly stressed. Since the fuel rods 11 are suspended from upper grid 13 and are free to expand lengthwise in lower grid 14, any differential in thermal expansion between rods 11 and guide tubes 12 will impose no additional strain upon the guide tubes 12.

What is claimed is:

1. In a fuel assembly for a nuclear reactor having a plurality of fuel rods and guide tubes maintained in adjacent parallel relationship by grids positioned in spaced relationship along the length of said rods and intermediate the ends of the rods, the improvement comprising:

An upper end grid for dependently supporting the fuel rods having parallel rows of T-shaped slots, a number of cylindrical guide tube fittings spaced from each other and in adjacent relationship with said T-shaped slots, said fittings being of open end construction positioned in the upper end grid, A T-shaped key provided on one end of each of the fuel rods for separable supporting engagement with said T-shaped slots, guide tubes each having an end passing through said cylindrical guide tube fittings and engagement means for securing said guide tubes in position, A projecting pin provided on the opposite end of each of the fuel rods, A lower end grid having an array of recesses and cylindrical guide tube fittings of open end construction received within said lower end grid, said guide tubes passing through said cylindrical guide tube fittings and separably secured therein for supporting engagement of said lower end grid, and said recesses adapted for separable supporting engagement of said projecting pins.

* * * * *